UNITED STATES PATENT OFFICE.

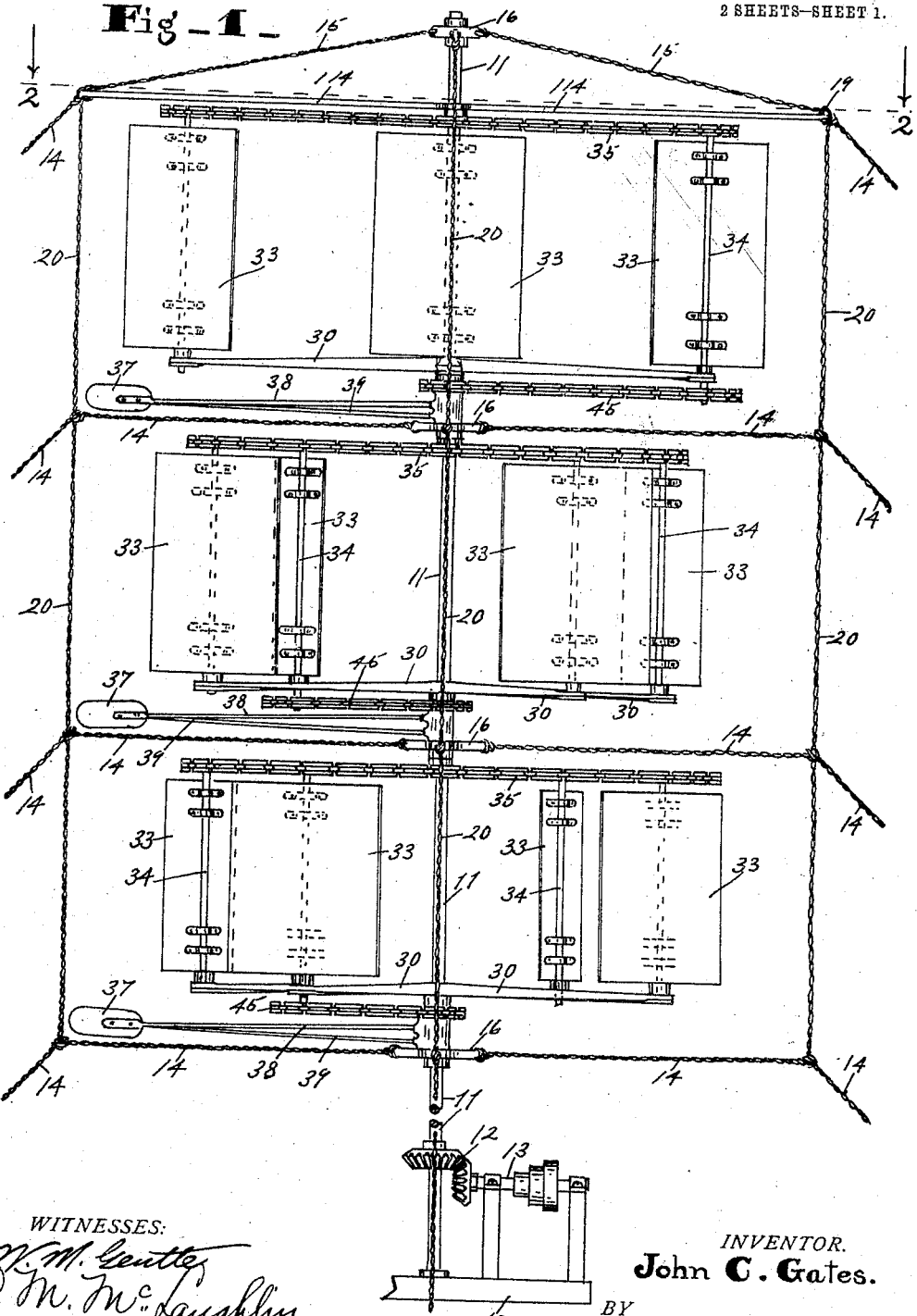

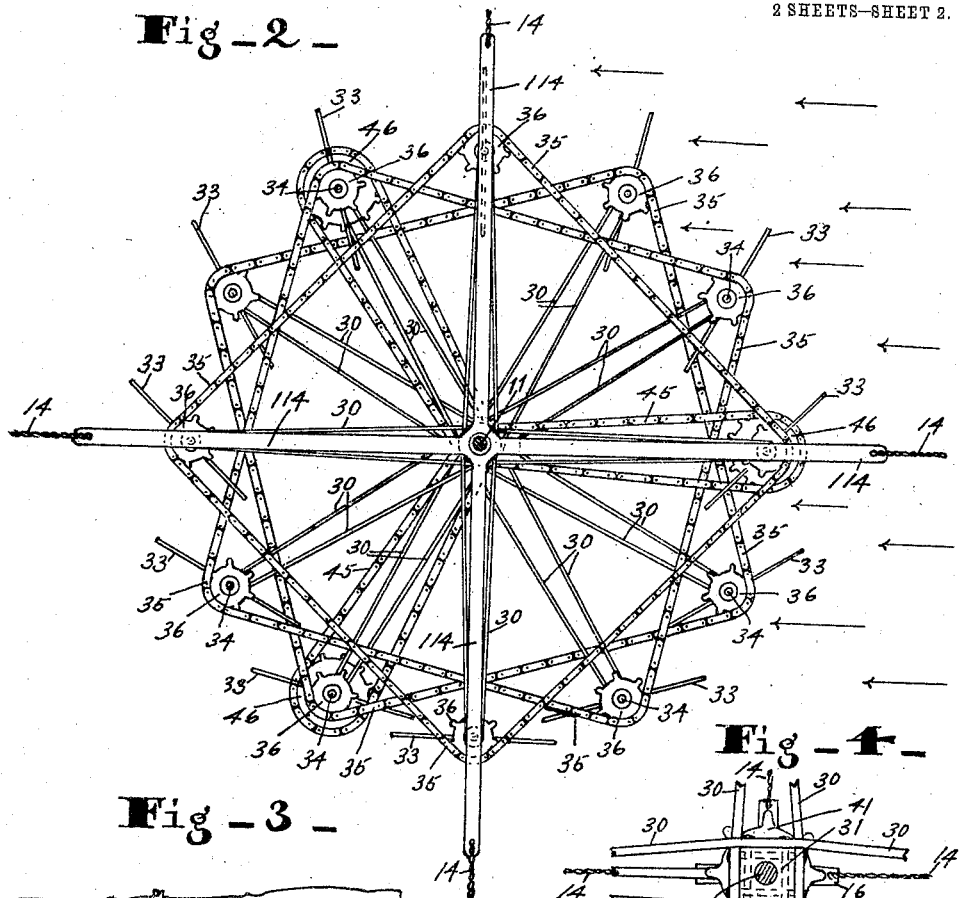

JOHN C. GATES, OF INDIANAPOLIS, INDIANA.

POWER APPARATUS.

1,006,646.　　　　Specification of Letters Patent.　　Patented Oct. 24, 1911.

Application filed October 21, 1909, Serial No. 523,763. Renewed August 31, 1911. Serial No. 647,033.

*To all whom it may concern:*

Be it known that I, JOHN C. GATES, of Indianapolis, county of Marion, and State of Indiana, have invented a certain new and useful Power Apparatus; and I do hereby declare that the following is a full, clear, and exact description thereof, reference being had to the accompanying drawings.

The object of this invention is to improve the construction of wind motors so as to render the construction and erection thereof convenient and simple and dispense with the tower, and also to increase the power and effectiveness of the machine.

One feature of the invention consists in mounting the driven shaft in a vertical position by means of a system of cables united at points and connected at intervals with said shaft so as to maintain the same in a vertical position, and also to furnish spaces between the cables wherein wind wheels may be secured on the shaft.

Another feature of the invention consists in arranging a single driven shaft vertically and mounting upon it a plurality of wind wheels that coact in transmitting the power of the wind to the shaft.

Another feature consists in the details of construction whereby the vane is mounted on the shaft and controls the position of the blades of the wind wheel.

The nature of the invention will be understood from the following description and claims and the accompanying drawings.

In the drawings Figure 1 is a side elevation of the device with parts of the stay wires broken away. Fig. 2 is a section on the line 2—2 of Fig. 1. Fig. 3 is a central vertical section through a portion of the shaft and one of the wind wheels. Fig. 4 is a horizontal section of the right-hand portion of Fig. 3 on the line 4—4.

No tower is used in constructing this mechanism.

Upon any suitable base, such as the base 10, the driven shaft 11 is mounted vertically with bearings in the base, and it carries means such as the bevel gear 12, for transmitting its power to the mechanism 13. The driven shaft 11 is maintained upright by a system of stays 14 running therefrom to the ground. The upper set of stays have rigid horizontal portions or rods 114 bearing on the shaft 11 and extending outwardly therefrom for some distance. The remainder of said sets of stays may be flexible. The other sets of stays have also corresponding horizontal portions but they need not be rigid as all the other parts of said lower sets of stays may be flexible. These different sets of stays are spaced apart so that wind wheels may be mounted between them. There is a set of stays above and below each wind wheel. The portions of stays 14 between the wheels and the rods 114 above the upper wheel are maintained in a horizontal position by a set of stays 15 that are connected with a bearing 16 at the upper end of the shaft 11 and extend outwardly to the outer end of the rods 114 and the upper sets of stays 14 and thence down vertically to the other stays, said stays 15 being united with all of the other stays which they intersect so as to maintain portions of said stays 14 in a horizontal position, as shown in Fig. 1. Each set of stays preferably contains four stays at ninety degrees apart.

Each wind wheel consists of upper and lower frames, each made of four radial arms 30 which extend from a sleeve 31 that is secured to the shaft 11 by a bolt or otherwise. Between the ends of each pair of upper and lower arms a wing 33 is mounted centrally on a vertical rod 34 having bearings in the outer ends of the upper and lower arms of the frame 30, so that the wings will extend horizontally and at any angle to the arms with which the same may be held by the sprocket chain 35. The sprocket chain 35 extends about four sprocket wheels 36, one mounted on the upper end of each rod 34 connected with the wind wheel, and since there are four of such rods, there are four sprocket wheels 36 one at each of the angles of a quadrangle, see Fig. 2. The chain 35, therefore, maintains the wings 33 in a certain relative position to each other and to the vane 37. The vane is mounted on the outer end of a pair of rods 38 and 39 which extend horizontally and outwardly from a sleeve 40 which is secured to a sprocket wheel 41. The sleeve 40 and sprocket wheel 41 are here shown integral and rotatably mounted on the shaft 11 immediately above the bearing plate 16. This latter plate rides upon balls 42 which travel in a ball course in the upper surface of the plate 43, which is secured to the shaft 11 by screw 44. A sleeve 31 is mounted on said shaft immediately above the sprocket wheel 41. The relative positions of these parts are indicated in Fig. 3. The sprocket wheel chain extends from the wheel 41 to a sprocket wheel 46 twice as large on the lower end of one of the rods 34. The rod 39 of the vane is located below the rod 38 at its inner end so as to serve as a brace. The arms 30 are likewise formed of two parts or bars, as seen in Fig. 4, but not necessarily so.

The vane 37 will determine the position of the wings with relation to the wind, as shown in Fig. 2. The sprocket chains 35 and 45 are so mounted on the sprocket wheels that when one wing faces the wind fully, the diametrically opposite wing will extend parallel with the wind, and the other two wings will be at angles to the wind, as shown in Fig. 2. As the wheel turns, the wing which faced the wind gradually recedes and turns to an angle with reference thereto, while the succeeding wing is turned by the chain 35 more and more into position at right angles to the wind, and thus as the wheel turns, the wings successively move into and out of position to be actuated by the wind. As the wind shifts, the said wheel will shift correspondingly by virtue of the vane 37, and since that vane is rigidly connected with the sprocket wheel 41 and that is geared up with the chain 35 which controls the wings, the vane will always hold the wings in the proper relation to the wind to enable the wind to have the most powerful influence on the wind wheel.

When a plurality of wind wheels are employed on one shaft, three being herein shown, they are set in a staggered position, being arranged in such relative position at the time of assembling the parts so that when the vanes of the different wind wheels are in vertical alinement, the wings of the different wind wheels will be staggered with relation to each other, as shown in Fig. 2. This conduces to smoothness and uniformity of movement of the entire device under the influence of the wind. It makes the influence of the wind on the shaft 11 and the mechanism it drives quite constant and avoids the fitful or intermittent action that arises from the use of a central wind wheel or from a plurality with the wings in vertical alinement.

While the invention has been referred to herein as adapted to be actuated by air, it is capable also of being actuated by flowing water, in fact, by any moving gas or liquid.

I claim as my invention:

1. Apparatus to be actuated by a moving gas or liquid in which the apparatus is submerged including a vertical shaft, wheels mounted on said shaft receiving power from the gas or liquid, horizontal rigid stays above said wheels and extending from said shaft out beyond the wheels, flexible stays suspended from the outer ends of said horizontal rigid stays, horizontal connections between said suspended stays and the shaft intermediate the wheels, and stays extending from the vertical stays near their union with said horizontal stays and connections at an outward and downward inclination to some fixed point.

2. Apparatus to be actuated by a moving gas or liquid in which the apparatus is submerged including a vertical shaft, wheels mounted on said shaft receiving power from the gas or liquid, bearing plates on said shaft at the top of the shaft and above each wheel and below the lower wheel, rigid horizontal stays connected with the bearing plate above the upper wheel, and extending out beyond said wheel, stays extending from the bearing plate at the upper ends of the shaft to the outer ends of said rigid stays, horizontal flexible stays suspended from the outer ends of said rigid stays, flexible connections between said suspended stays and the bearing plates between the wheels and upper or lower wheels, and flexible stays connected with said suspended stays at their union with said horizontal stays and connections and extending at an outward and downward inclination to some fixed point.

In witness whereof, I have hereunto affixed my signature in the presence of the witnesses herein named.

JOHN C. GATES.

Witnesses:
G. H. BOINK,
O. M. McLAUGHLIN.